United States Patent [19]

Gore

[11] Patent Number: 5,257,657
[45] Date of Patent: Nov. 2, 1993

[54] METHOD FOR PRODUCING A FREE-FORM SOLID-PHASE OBJECT FROM A MATERIAL IN THE LIQUID PHASE

[75] Inventor: David W. Gore, Corvallis, Oreg.

[73] Assignee: Incre, Inc., Corvallis, Oreg.

[21] Appl. No.: 910,249

[22] Filed: Jul. 8, 1992

Related U.S. Application Data

[63] Continuation-in-part of Ser. No. 550,875, Jul. 11, 1990, abandoned.

[51] Int. Cl.⁵ .............................................. B22D 23/00
[52] U.S. Cl. ...................... 164/46; 164/66.1; 164/94; 264/308; 264/309
[58] Field of Search .............. 164/46, 94, 154, 155, 164/66.1; 264/308, 309

[56] References Cited

U.S. PATENT DOCUMENTS

| | | | |
|---|---|---|---|
| 3,222,776 | 12/1965 | Kawecki | 164/46 X |
| 4,665,492 | 5/1987 | Masters | 364/468 |
| 4,775,092 | 10/1988 | Edmonds et al. | 228/222 |
| 4,818,562 | 4/1989 | Arcella et al. | 427/53.1 |
| 4,842,186 | 6/1989 | Doyle et al. | 228/222 |
| 4,857,694 | 8/1989 | Doyle et al. | 219/76.12 |
| 4,911,353 | 3/1990 | Deakin | 228/183 |
| 4,938,275 | 7/1990 | Leatham et al. | 164/46 |
| 5,038,014 | 8/1991 | Pratt et al. | 219/121.64 |
| 5,071,503 | 12/1991 | Berman | 156/250 |
| 5,121,329 | 6/1992 | Crump | 264/239 X |
| 5,136,515 | 8/1992 | Helinski | 364/468 |
| 5,141,680 | 8/1992 | Almquist et al. | 264/22 |
| 5,171,360 | 12/1992 | Orme et al. | 75/331 |

FOREIGN PATENT DOCUMENTS 0426363 5/1991 European Pat. Off. .

Primary Examiner—J. Reed Batten, Jr.
Attorney, Agent, or Firm—Stoel Rives Boley Jones & Grey

[57] ABSTRACT

A free-form, three-dimensional, solid-phase object (30) is produced from droplets (24) of liquid-phase material having appreciable surface tension and well-defined solidification properties. The liquid-phase material is ejected from an ejection head (20) in discrete droplets onto a substrate (98). The temperature, frequency, size, and trajectory of the droplets and the relative speed of motion between the substrate and the ejection head are adjusted to compensate for the physical properties of the liquid-phase material and the heat dissipation characteristics of the growing object to form a desired object (212).

23 Claims, 3 Drawing Sheets

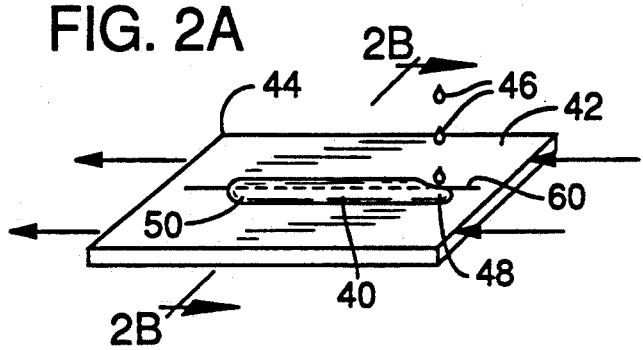
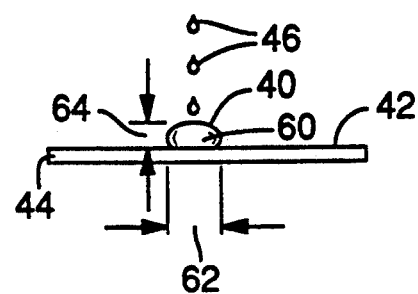
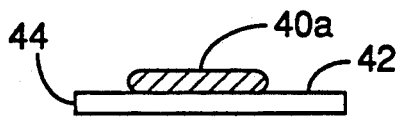
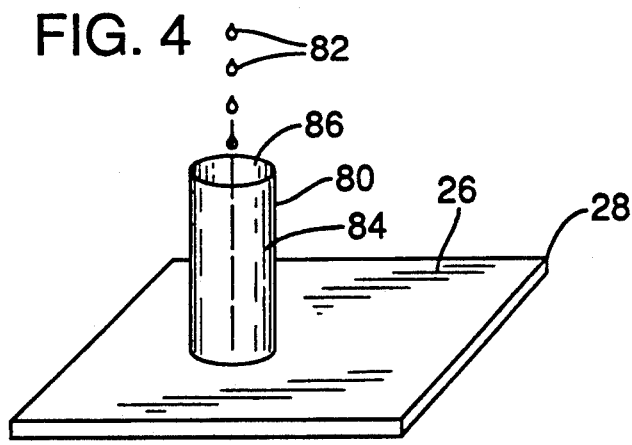
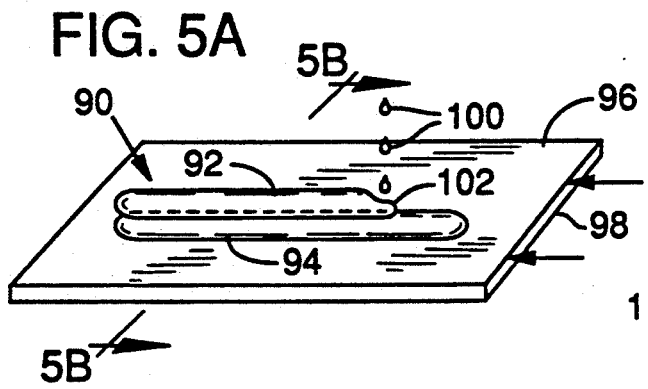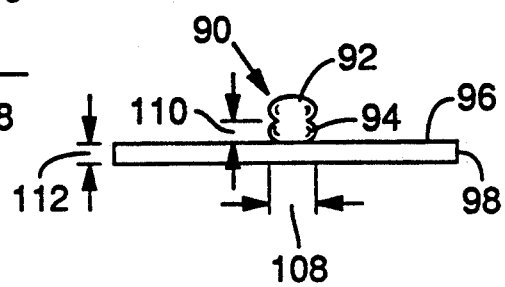

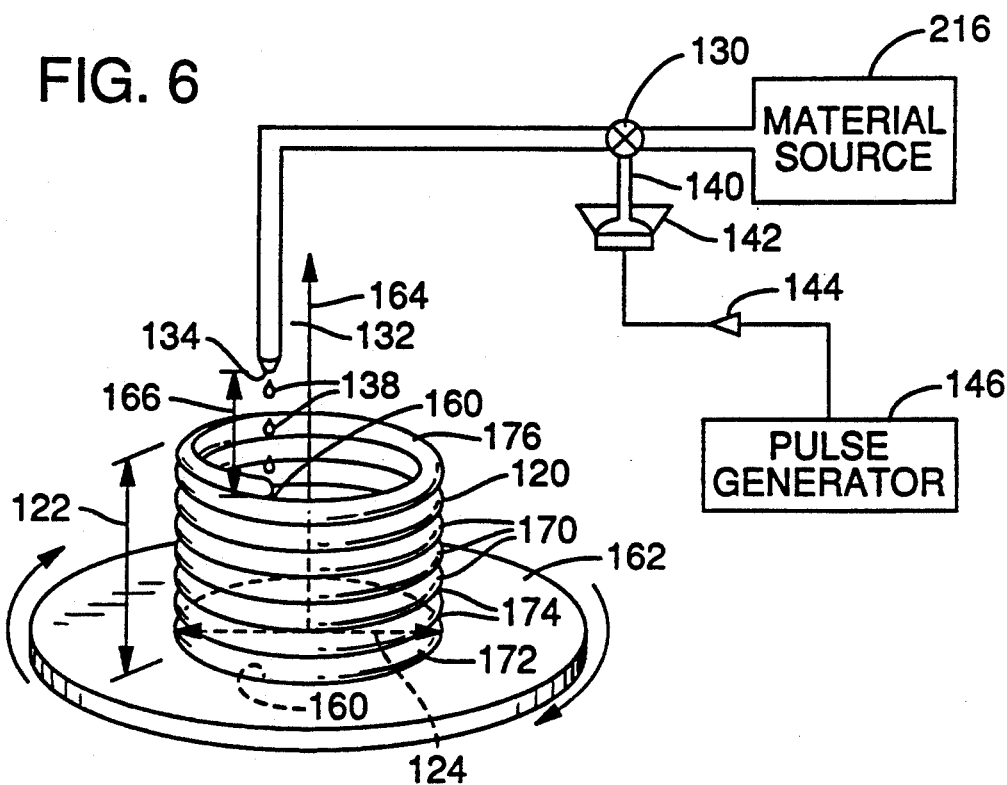

METHOD FOR PRODUCING A FREE-FORM SOLID-PHASE OBJECT FROM A MATERIAL IN THE LIQUID PHASE

This application is a continuation-in-part of U.S. patent application No. 07/550,875, filed Jul. 11, 1990, now abandoned.

TECHNICAL FIELD

The present invention relates to producing three-dimensional, free-form, solid-phase objects and, in particular, to producing such objects in a droplet by droplet fashion from a material in the liquid phase.

BACKGROUND OF THE INVENTION

Conventional techniques for producing three-dimensional objects typically include assembling, machining, deforming, or casting. Assembly often involves gluing or welding individual components of moderate size together, while machining and deforming often involve removing material from or stressing the shape of preformed objects.

Casting, on the other hand, typically involves the injection of a liquid solution or polymer or a molten material into a mold. Casting is not, however, easily employed for manufacturing large objects or objects containing internal voids because polymerization and solidification are difficult to control within a mold. Casting is also a generally expensive method for generation of objects having custom shapes, especially for objects needed in small quantities.

U.S. Pat. No. 3,222,776 of Kawecki describes several embodiments for treating molten material. At column 6, lines 32-44 and in FIG. 5, Kawecki describes the ejection of droplets of molten material. Kawecki employs an ultrasonic generator to vibrate a discharge conduit at a predetermined frequency and amplitude in order to overcome the surface tension of the molten metal within the conduit. The resulting droplets harden while dropping from the end of the discharge conduit, are not discharged at the ultrasonic frequency but at an undetermined, inconsistent droplet discharge rate, and have uncontrolled trajectories and inconsistent diameter. This process is used only to create solid spheres of limited size and is not contemplated for building up free form structures in a controlled fashion.

At column 6, lines 45-55, and in FIG. 6, Kawecki describes an embodiment for ejecting a fine mist or spray 61 of molten material. Kawecki uses a mask or template to form objects because the mist or spray has a highly uncontrolled trajectory. This process vaguely resembles casting.

At column 6, lines 3-31, Kawecki describes an embodiment of his invention for extruding semisolid material in a continuous flow to create single filaments. The deposition rate of such a process is typically so high that it would cause slumping of a free form object deposited in layers. Although use of a very small orifice might reduce the slumping of the object due to high deposition rates, such a small orifice would tend to become plugged.

European patent application No. 90 311 640.8 of Crump describes a continuous flow delivery process now used commercially for viscous melts such as wax or plastic materials. Crump specifies that the delivery temperature of the material must be maintained close to its melting point (typically 1° C. above its melting point). Use of a delivery temperature so close to the melting point would result in poor layer to layer bonding in materials such as metals. Crump also controls the distance of the ejection head from the substrate and employs the ejection head as a doctoring blade to limit the height or thickness of the layers of the viscous materials.

U.S. Pat. No. 4,655,492 of Masters, which is herein incorporated by reference, describes a method for constructing free-form objects from particulate matter in a manner that circumvents some of these problems. Masters directs individual particles of ceramic material to particular locations in a three-dimensional coordinate system and attaches the particles with adhesives to a seed point or previously deposited particles, gradually constructing an object of desired shape. Masters also describes the use of droplets of a water slurry containing ceramic particles which freezes upon impact with a seed point or previously deposited particles. The water is then presumably removed by lyophilization, creating a porous ceramic object. In either of these methods, the rate of deposition is independent of the type of particles used, and the time delay between deposition of the particles does not substantially affect the shape or solidity of the intended object.

The method of Masters would not, therefore, work well if it were applied to nonparticulate matter, such as materials in the liquid phase, especially those having well-defined solidification properties such as freezing points or polymerization initiators. In particular, Masters' slurry-droplet method would not work well for forming objects from molten salts, molten metals, or certain polymers. Such droplets take an irregular shape upon impact, and, if they freeze immediately, they retain that shape. The objects thus formed are typically irregular, weak, and porous.

SUMMARY OF THE INVENTION

An object of the present invention is, therefore, to provide a method for producing a free-form solid-phase object from a material in the liquid phase.

Another object of this invention is to provide such a method that controls the rate of deposition of the material in the liquid phase as well as characteristics of the environment to produce a strong, regular, nonporous, three-dimensional object of predetermined shape.

A further object of this invention is to provide such a method for forming such an object from a molten metal or salt.

The method of the present invention employs a system for repetitively ejecting fine droplets of a material in the liquid phase, many times a second, along a controllable or common trajectory. The droplets impact and coalesce with a substrate of either seed surface material or previously ejected droplets to form a spheroid. The shape and dimensions of the spheroid are determined primarily by environmental conditions, surface tension and solidification properties of the material, and size and ejection frequency of the droplets ejected from an ejection head. When the substrate is moved relative to consecutively ejected droplets so that they impact towards one end of the spheroid, they meld with the spheroid, elongating it into a relatively smooth rod-like shaped object or bead which cools and solidifies at an originating end while continuing to lengthen at a growing end.

Unlike the slurry of Masters, the droplets do not solidify on impact. They add bulk to the growing or liquid end of a bead, causing it to swell to a diameter wider than the diameter of the droplets. As the droplets impact toward an edge of the growing end of the bead, the turbulence they create extends the borders of the bead quickly in the direction of that edge, substantially controlling the direction of bead growth. A strong, dense, solid-phase object of any predetermined shape can be produced in this manner. This method can, therefore, be used to quickly and inexpensively produce functional prototypes for many industrial applications.

Additional objects and advantages of the present invention will be apparent from the following detailed description of preferred embodiments thereof, which proceeds with reference to the accompanying drawings.

BRIEF DESCRIPTION OF THE DRAWINGS

FIGS. 2A and 2B are respectively an isometric view and a cross-sectional side view cut through section 2B—2B of FIG. 2A, showing horizontal bead formation in accordance with a preferred embodiment of the present invention.

FIGS. 3A and 3B are cross sectional side views showing the effects of gravity, surface tension, and deposition rate with respect to bead formation.

FIG. 4 is an isometric view showing vertical bead formation.

FIGS. 5A and 5B are respectively an isometric view and a cross-sectional side view cut through section 5B—5B of FIG. 5A, showing formation of a wall from layers of beads.

FIG. 6 is an isometric view showing formation of a hollow cylinder in accordance with the method and system of present invention.

FIG. 7 is an isometric view showing formation of a hollow sphere.

DETAILED DESCRIPTION OF PREFERRED EMBODIMENTS

Figure 1:
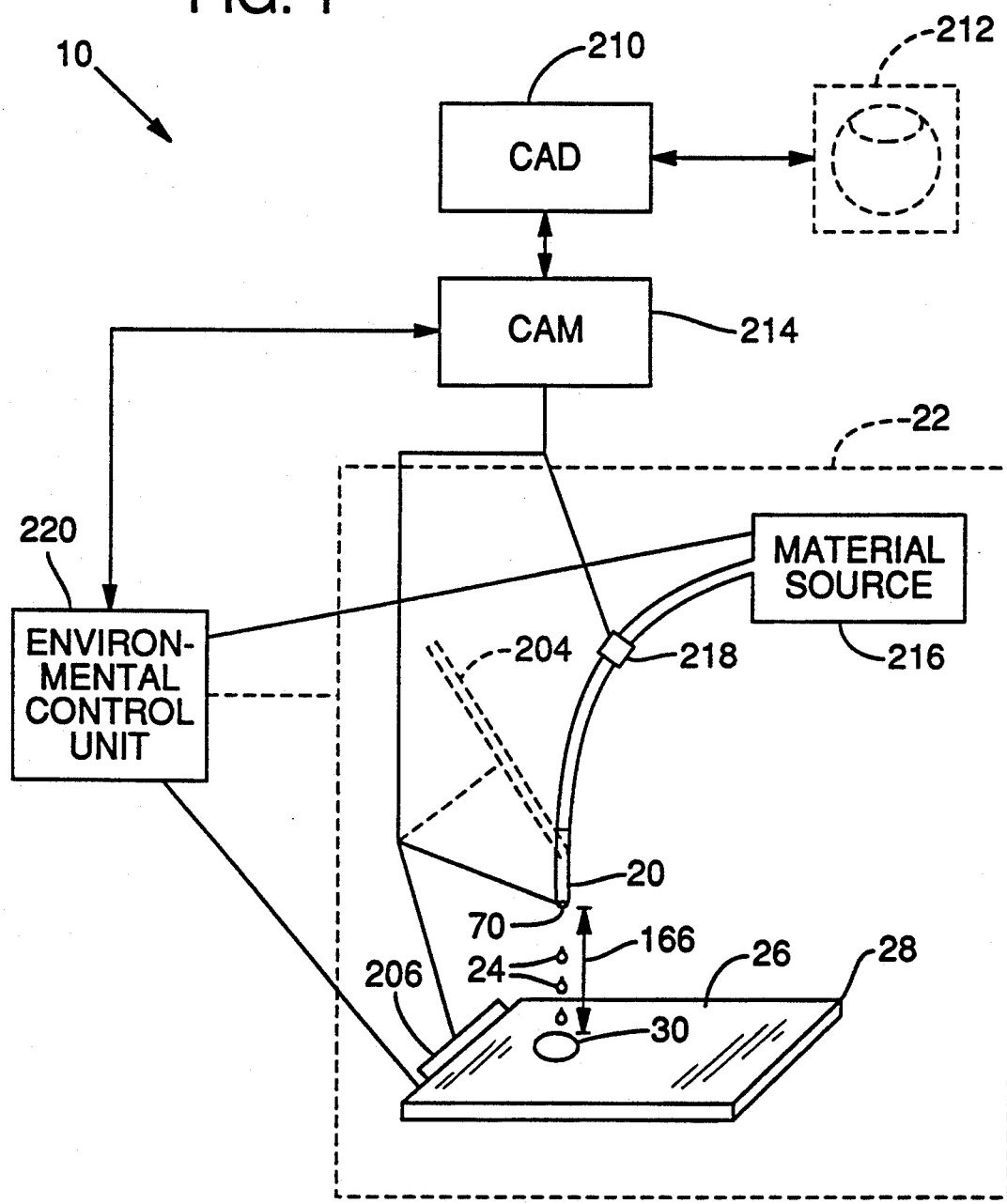
FIG. 1 is a schematic diagram of a preferred embodiment of an object forming system of the present invention showing an isometric view of object formation.

FIG. 1 shows a preferred embodiment of an object forming system 10 of the present invention. System 10 employs an ejection head 20 within an enclosure 22 that provides a controllable environment to expel droplets 24 of a material in the liquid phase toward a predetermined position on a surface 26 of a substrate 28 to form a spheroid object 30.

With reference to FIGS. 1 and 2, a relatively smooth rod-shaped object or bead 40 can be produced by moving ejector head 20 relative to surface 42 of substrate 44 and ejecting consecutive droplets 46 at controllable time intervals toward a growing end 48 of bead 40. Droplets 46 meld with growing end 48 of bead 40 while previously expelled droplets solidify toward a seed point or an originating end 50. It is noted that the expelled droplets forming originating end 20 may be in different stages of the solidification continuum.

Manipulation of several factors such as the gravity, temperature, and pressure of the environment; the surface tension, solidification temperature, or polymerization characteristics of the droplet material; and the size of or rate at which the droplets are expelled from the ejection head can greatly affect the diameter, smoothness, solidity, and strength of bead 40.

For example, gravitational forces tend to flatten the shape of bead 40, as shown in FIG. 3A, thereby partly offsetting the tendency of surface tension to give bead 40 a rounded cross section as shown in FIG. 3B. The effect of gravity is more obvious for wide beads 40a that result from rapid deposition of the liquid-phase material than the effect of gravity is for narrow beads 40b. The balance between surface tension and density of the liquid-phase material also largely determines the height of a bead. With reference to FIG. 2B, the points at which the droplets impact on the growing end of bead 40 define only its midline 60 but not its width 62. The midline 60 of bead growth is unrelated to width 62 or height 64 of bead 40.

The width of bead 40 is also varied by changing the mass of liquid-phase material that is delivered per unit time, preferably by controlling the ejection frequency or the droplet size. The material choice largely determines an appropriate temperature range for smooth solidification without flattening. Then the droplet size or ejection frequency is typically adjusted to form a bead 40 of desired width 62. For most applications, the droplet size is preset and the ejection frequency is varied. More frequent finer droplets generally provide smoother beads 40 and objects 30 than less frequent larger droplets.

During creation of bead 40, an orifice 70 of ejection head 20 should preferably be positioned as close to the substrate surface 42 as possible without touching the growing end 48 of bead 40. The proximity of orifice 70 to surface 42 and growing end 48 makes small inaccuracies in ejection trajectories less important and allows the droplets 46 to retain most of their heat. Such inaccuracies can be more significant if the droplets are ejected horizontally or from an ejection bead at an angle, as opposed to vertically downwards as shown in FIG. 1. However, decreasing the gap between the ejection head and growing end 48 reduces the amount of time droplets 46 are subject to gravitational forces and thereby typically reduces the inaccuracies resulting from such nonvertical trajectories. A slower ejection rate also tends to increase the controllability and predictability of the trajectories. If substrate surface 42 is moved relative to a stationary ejection head 20, then droplets 46 should preferably travel along a common trajectory.

With reference to FIG. 4, a vertical bead 80 having a circular cross section can also be constructed if impacting droplets 82 are directed toward midline 84 of a growing end 86 of vertical bead 80. As with horizontal beads, the diameter of bead 80 largely depends on the temperature, density, and surface tension of the liquid-phase material. The selection of material largely determines the density, surface tension, and temperature range for impacting droplets 82. The diameter of bead 80 can, however, be adjusted by controlling the diameter of orifice 70, the frequency at which ejection head 20 emits droplets 82, and the temperature of the liquid-phase material within the temperature range. These factors should be maintained within ranges that prevent solidification on impact as well as prevent dripping down along a side of growing vertical bead 80.

With reference to FIGS. 5A and 5B, walls 90 of larger objects can be constructed by laying beads on top of or next to one another. For example, FIG. 5A shows an upper bead 92 being laid on top of a lower bead 94, and FIG. 5B shows a cross-sectional side view of wall 90 on surface 96 of substrate 98. As droplets 100 impact growing end 102 of upper bead 92, they partly melt lower bead 94 before both beads solidify, thereby bonding beads 92 and 94 together. Additional beads may be added to bead 92 to produce infinitely high walls 90.

Walls with both simple and compound curves may be constructed by controlling the position of the substrate 98 relative to the position of ejection head 20 and the extent to which upper bead 92 is offset relative to lower bead 94. Thus, the present invention makes possible the creation of hollow cylinders, spheres, toroids, as well as other more complex shapes.

The strength of the bond between beads 92 and 94 largely depends on the extent to which lower bead 94 melts when upper bead 92 is laid on top of it. More melting occurs when either the impacting liquid-phase material is hotter or when the lower bead 94 is warmer. Preferably, the droplet ejection temperature is maintained well (at least 5° C.) above the solidification temperature of the material to promote good bonding. Temperatures that are too low may result in weaker bonds, and temperatures that are too high may cause slumping of wall 90. Thus, the temperatures of lower bead 94 as well as impacting droplets 100 are preferably controlled within well-defined temperature ranges to avoid weak bond formation or excessive thermal build-up.

Also, the extent to which lower bead 94 melts when upper bead 92 is deposited upon it largely determines width 108 of wall 90. For example, whenever the temperature of the liquid-phase material is relatively high, half or more of the volume of lower bead 94 may melt, thereby causing walls 90 to be thicker. Higher deposition temperatures also tend to decrease effective height 110 of each bead, typically entailing the use of additional beads to achieve a wall 90 of a given height.

The diameter of orifice 70 also affects the width and therefore the strength of wall 90. Hence by varying the size and frequency of the droplets, the relative speed of motion between substrate 98 and ejection head 20, and the deposition temperature of the liquid-phase material to control the extent to which each upper bead 92 melts its respective lower bead 94, a variety of wall thicknesses may be generated.

Overheating of an object or structure made from a wall 90 may result if the liquid-phase material is laid down too rapidly. The maximum permissible rate depends on the ambient temperature relative to the melting point of the material, the thermal conductivity of the material, and the current geometry of the object that has already been laid down.

Molten metals, for example, may be laid down relatively quickly because their melting points are typically greater than ambient temperatures and their high thermal conductivity allows a greater portion of the object being constructed to contribute to heat dissipation. Molten metals are thus the preferred material for utilizing the present invention. Because most molten metals when exposed to air become coated with an oxide layer that typically interferes with bonding, the controllable environment within enclosure 22 shown in FIG. 1 preferably contains an inert gas atmosphere or vacuum. Persons skilled in the art will note that the controllable environment may be nothing more than a generic room having an ambient air temperature and composition.

It is preferable to build small objects from narrow beads or bead layers because thin walls dissipate the heat from their own generation more efficiently than do thicker walls. Small objects have less surface area for dissipating heat and, therefore, cannot tolerate as high a temperature or liquid-phase material deposition rate as can larger objects. The ability of a particular object under construction to dissipate heat can generally be gauged by determining the path length of a bead around the object. The longer path length, the more rapidly the liquid-phase material can be deposited without causing the object to slump from overheating.

The mass and temperature of substrate 98 also affect the geometry of the first few bead layers. A relatively cold substrate surface 96 will cool lower bead 94 more significantly than upper bead 92 or subsequent beads further from substrate 98. In addition, less of lower bead 94 will melt during deposition of upper bead 92 than will melt of upper bead 92 during deposition of a subsequent bead. A cold substrate may, therefore, produce more distinct and weaker joints between lower bead 94 and upper bead 92 than between upper bead 92 and a subsequent bead. This effect gradually decreases between subsequent beads further from substrate 98. The resulting inconsistency in joint formation produces objects of less regular shape and interbead bond strength.

However, increasing the speed and temperature at which an upper bead 92 is deposited on a cold (ambient room temperature) lower bead 94 produces a stronger and more regular wall 90. For example, a 19 mg/mm tin bead 92 deposited at a speed of 22 mm/sec and a temperature of 400° C. on similarly deposited bead 94 that was allowed to cool for two minutes, exhibited considerably better bonding than a similar bead 92 deposited at 400° C. at a speed of 10.6 mm/sec.

In addition, if substrate 98 is too thin or is a thermal insulator, an even more noticeable effect is produced. Lower bead 94 will not substantially solidify, and deposition of upper bead 92 and subsequent beads will result in a puddle of liquid-phase material. To substantially eliminate these effects and the effect of cold bonding, a preferred embodiment of the present invention employs a preheated metallic substrate having a thickness 112 substantially equaling the intended width 108 of wall 90. The temperature of substrate 98 is preferably raised initially to an equilibrium temperature that the wall 90 or the object is likely to reach during its construction. This equilibrium temperature is preferably only slightly below the solidification temperature of the liquid-phase material for structures or objects that are built up rapidly, and closer to ambient temperature for large walls or structures built up slowly. The strongest walls having the least obvious junction between bead layers are produced at just below the temperature that causes slumping. Although regulating the temperature of the liquid-phase material and substrate 98 is substantially straightforward, controlling the temperature of wall 90 or the object under construction entails careful consideration of the factors previously discussed.

With reference to FIG. 6, the construction of a small hollow, spiral ribbed cylinder 120, having a height 122 of 36 mm and a diameter 124 of 20 mm, is described below in accordance with the principles of the present invention. Although objects like cylinder 120 can be produced in accordance with the aid of a sophisticated computerized system resembling that used by Masters, this invention can be practiced with relatively simple equipment because, unlike the invention of Masters, small inaccuracies in trajectory do not substantially determine the final shape of such objects.

To create cylinder 120, molten tin under a static head of about 80 mm was passed through a valve 130 and out of ejection head 132 through a 0.5 mm diameter orifice 134. Molten tin droplets 138 at 350° C. were produced by a vibrating plunger 140 glued to a five watt audio speaker 142 that was powered by an amplifier 144 receiving signals from a voltage pulse generator 146. Plunger 140 alternately opened and closed valve 130 in response to the vibration frequency of speaker 142 to eject droplets 138 of approximately 5 mg at a rate of 30 droplets per second at 350° C. from ejection head 132. Droplets 138 were directed towards a target surface 160 on a 3 mm thick aluminum sheet 162 surrounded by an argon atmosphere at room temperature. Sheet 162, which was operatively connected to the drive shaft of a motor (not shown), was rotated at a rate of about 8.8 seconds per revolution, and droplets 138 were directed onto the sheet 162 towards a point about 8 mm from spin axis 164. A gap 166 between orifice 134 and target surface 160 was preferably maintained at about 2 mm by lowering sheet 162 as cylinder 120 grew taller. Because sheet 162 was initially relatively cool, beads 170 toward bottom 172 of cylinder 120 were only 3 mm wide and the junctions 174 between neighboring beads 170 were about 1.36 mm apart. Near top 176 of cylinder 120, where target surface 160 was warmer, beads 170 were about 3.7 mm thick and the junction-to-junction distance was only about 0.94 mm. The rate, about 150 mg per second, of deposition of the liquid-phase material was close to the limit for such a small cylinder 120. Increasing the rate would have resulted in the slumping of cylinder 120.

Preferably, the time to lay each bead 170 is kept substantially constant regardless of the diameter 124 of cylinder 120. However, because the path length for bead 170 deposition for the construction of cylinder 120 is its circumference, a cylinder 120 having a larger diameter 124 will tolerate a higher liquid-phase material deposition rate. As a result, large and small diameter cylinders 120 require almost equal time to produce, time variations mostly resulting from differences in the number of bead layers rather than from differences in the path length.

With reference to FIG. 7, when a hollow sphere 190 is constructed, the path length is constantly changing. The liquid-phase material deposition rate is preferably initially relatively slow but is increased as the path length increases. After equatorial bead 192 is laid, the liquid-phase material deposition rate is then gradually slowed as the path length decreases.

FIG. 7 also illustrates another simple method of creating an object. For creation of sphere 190, a wire 194 is fed through one or more joints 196 to an ejection head 198 where wire 194 is melted so that droplets are ejected onto edge 200 of growing wall 202. Ejection head 198 may be designed to ride along the solidified part of wall 202 at a given rate so that little control of ejection head motion is necessary.

The space within the walls of a hollow object such as sphere 190 may be filled with liquid-phase material to generate a solid object such as a ball. This filling process is preferably accomplished by ejecting droplets at a high rate so that the liquid-phase material flows away from a central impact point until it reaches the walls. In order to prevent excessive heat accumulation and slumping, the filling process is preferably performed incrementally as the walls themselves are constructed.

For creation of less regular shapes, the use of more sophisticated equipment such as computerized automated design (CAD) and computerized automated manufacturing (CAM) systems resembling those used with milling machines can be adapted and employed in accordance with the present invention. Such combination of systems is described below with reference to object forming system 10 shown in FIG. 1.

CAD system 210 with input from an image and/or a user designs a desired object 212 in terms of a set of locations having position coordinates defined within a three dimensional coordinate system. The coordinate positions are fed into CAM system 214 which converts them into a sequence of movements of servomechanisms 204 and 206 that determine the relative positions of ejection head 20 and surface 26 and thereby the placement of droplets 24. The conversions incorporate surface tension and solidification properties of the specific liquid-phase material as well as heat dissipation properties for the shape of desired object 212 as it is constructed. CAM system 214 maximizes the properties for strength, uniformity, or smoothness and appropriately adjusts the temperature of substrate 28 and material source 216 via an environmental control unit 220. CAM system 214 also regulates valve 218 to determine the frequency at which droplets 24 are ejected from ejection head 20 or adjusts the diameter of orifice 70 to control the size of droplets 24. CAM system 214 may also employ environmental control unit 218 to regulate the pressure and temperature within enclosure 22.

Although metals are the preferred material for this method, non-metallic crystalline materials such as salts, which have a clear transition to the solid state, may also be used. This method does not work so well for glasses and plastics, which have no set transition temperature at which they become rigid.

It will be obvious to those having skill in the art that many changes may be made in the above-described details of the embodiments presented herein of the present invention without departing from the underlying principles throughout. For example, two ejection heads may be employed to produce wide beads. The scope of the present invention should, therefore, be determined only by the following claims.

I claim:

1. A method for producing a free-form, three-dimensional, solid-phase object from a liquid-phase metal having appreciable surface tension and well-defined solidification properties including a solidification temperature, comprising:
   ejecting along a controllable trajectory a first liquid-phase metal droplet from an ejection head positioned at a first ejection position toward a first target position; and
   ejecting along a controllable trajectory a second liquid-phase metal droplet from the ejection head at a second ejection position toward a second target position at a predetermined time interval from the ejection of the first droplet, the first and second droplets being ejected as discrete droplets at a temperature above the solidification temperature such that the second droplet melds with the first droplet prior to solidification of the first droplet to produce a free-form, three-dimensional, solid-phase object of a desired shape.

2. The method of claim 1 in which the object is hollow.

3. The method of claim 1 in which the ejection head includes an orifice of variable diameter from which the droplets are ejected, and further comprising adjusting the diameter of an orifice of the ejection head in relation to the surface tension of the liquid-phase metal to develop the desired shape of the object.

4. The method of claim 1 further comprising:
ejecting the first, second, and additional droplets to form a first bead layer; and
after solidification of the first bead ejecting subsequent droplets to form a second bead layer contacting the first bead layer, the second bead layer partly melting the first bead layer to provide a good bond between the layers.

5. The method of claim 1 in which the method is performed in a controllable environment that comprises air and in which the liquid-phase droplets comprise tin.

6. The method of claim 1 in which the method is performed in a controllable environment that comprises an inert gas and inhibits oxidation of the liquid-phase metal.

7. The method of claim 1 in which the method is performed in a controllable environment that includes a number of physical variables selected from a group comprising medium composition, medium temperature, substrate composition, substrate temperature, and metal ejection temperature.

8. The method of claim 1 in which the liquid-phase metal droplets are ejected at a temperature that is at least 5° C. greater than the solidification temperature.

9. The method of claim 1, further comprising adjusting the temperature at which the liquid-phase metal is ejected in relation to the surface tension and solidification properties of the liquid-phase metal to develop the desired shape of the object.

10. The method of claim 1 in which the liquid-phase metal is ejected at a rate and temperature that is just below a rate and temperature which would cause the object to slump.

11. The method of claim 1 in which a CAM system controls the time interval between the droplets, the positioning of the ejection head, and the temperature at which the droplets are ejected such that the liquid-phase droplets are ejected at selective predetermined rates, target locations, and temperatures.

12. The method of claim 1 in which the time interval is controllable and is varied between subsequent droplets.

13. The method of claim 1, further comprising adjusting the time interval in relation to the solidification properties of the liquid-phase metal to develop the desired shape of the object.

14. The method of claim 1, further comprising adjusting the time interval in relation to the heat dissipation properties of the object to develop the desired shape of the object.

15. The method of claim 1 in which horizontal displacement between the first ejection position and the second target position is adjustable and contributes to the shape of the object.

16. The method of claim 1 in which the first and second ejection positions are the same position and the second target position is displaced relative to the first target position by movement of the solid-phase object.

17. The method of claim 1 in which the first target position is located on a surface of a substrate having a temperature that is adjustable to affect the shape of the object.

18. The method of claim 17 in which the size of the substrate is adjusted to form the object in the desired shape.

19. A method for producing a free-form, three-dimensional, solid-phase object from a liquid-phase metal having appreciable surface tension and well-defined solidification properties including a solidification temperature, comprising the steps of:
ejecting along controllable trajectories at predetermined time intervals liquid-phase metal droplets having a temperature at least 5° C. greater than the solidification temperature to form a first bead layer; and
after solidification of the first bead ejecting along controllable trajectories at predetermined time intervals subsequent liquid-phase metal droplets having a temperature at least 5° C. greater than the solidification temperature to form a second bead layer that partly melts the first bead layer to provide a good bond between the first and second bead layers, thereby to produce a three-dimensional, solid-phase object of selective predetermined shape.

20. The method of claim 19 in which the liquid-phase metal comprises tin ejected at a rate and temperature that are just below a rate and temperature that would cause the object to slump.

21. The method of claim 19 in which a CAM system controls the time interval between the droplets, the positioning of an ejection head, and the temperature at which the droplets are ejected such that the liquid-phase droplets are ejected at selective predetermined rates, target locations, and temperatures.

22. A method for producing a free-form, three-dimensional, solid-phase object from a liquid-phase nonmetallic crystalline substance having appreciable surface tension and well-defined solidification properties including a solidification temperature, comprising:
ejecting along a controllable trajectory a first liquid-phase droplet of the nonmetallic crystalline substance from an ejection head positioned at a first ejection position toward a first target position; and
ejecting along a controllable trajectory a second liquid-phase droplet of the nonmetallic crystalline substance from an ejection head positioned at a second ejection position toward a second target position at a predetermined time interval from the ejection of the first droplet, the first and second droplets being ejected at a temperature that is at least 5° C. greater than the solidification temperature, whereby the second droplet fuses with the first droplet prior to solidification of the first droplet to produce a free-form, three-dimensional, solid-phase, nonmetallic crystalline object of a desired shape.

23. The method of claim 22 further comprising:
ejecting the first, second, and additional droplets to form a first bead layer; and
after solidification of the first bead ejecting subsequent droplets to form a second bead layer that contacts the first bead layer, the second bead layer partly melting the first bead layer to provide a good bond between the layers.

* * * * *